Oct. 26, 1948.    H. K. FERGER    2,452,117
SLIDING ANTIFRICTION BEARING
Filed Nov. 6, 1945    3 Sheets-Sheet 1
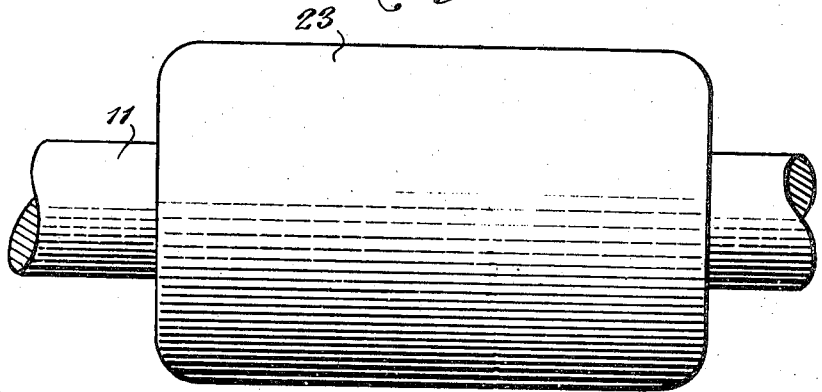
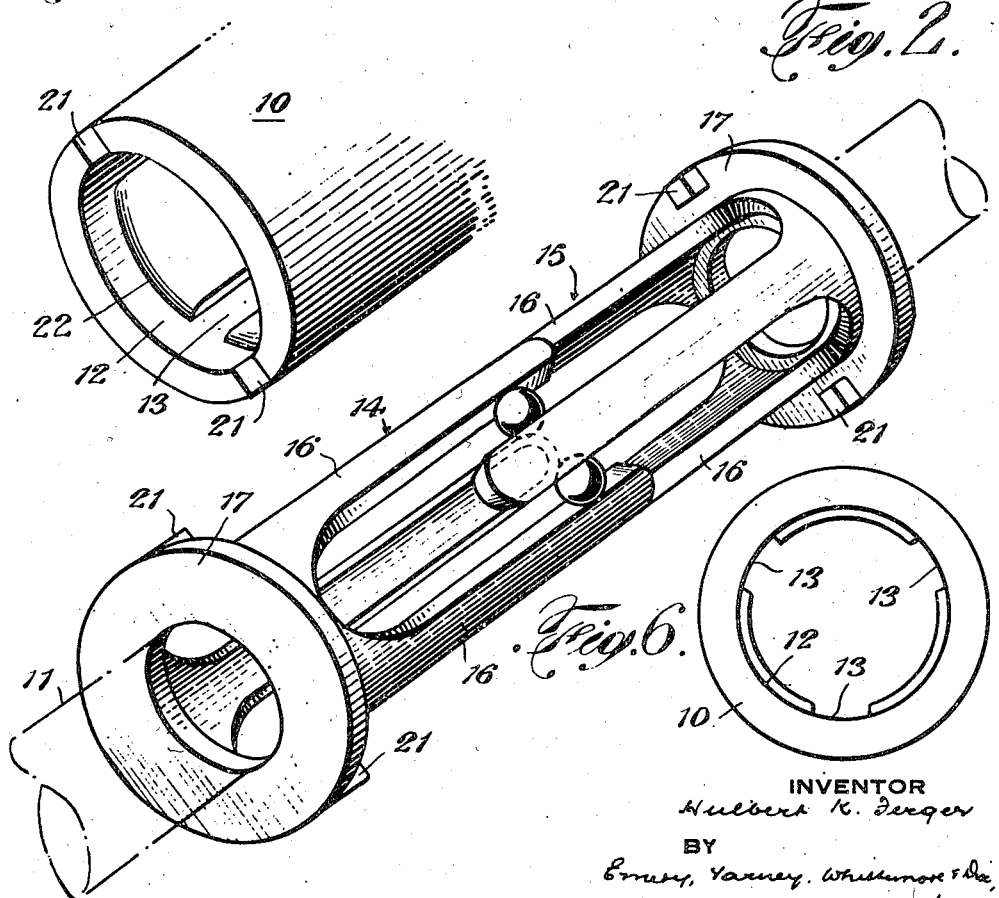

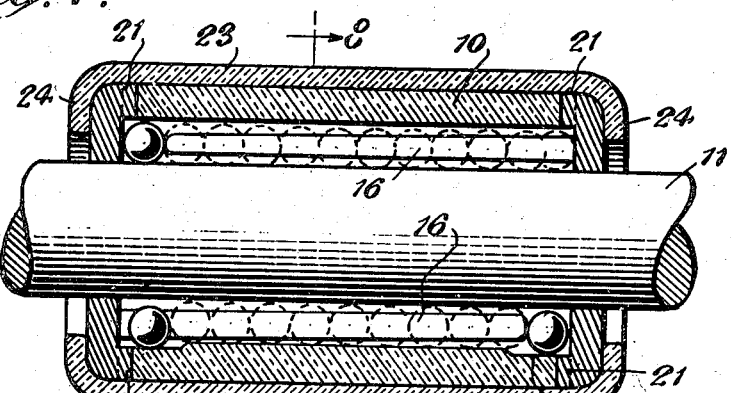
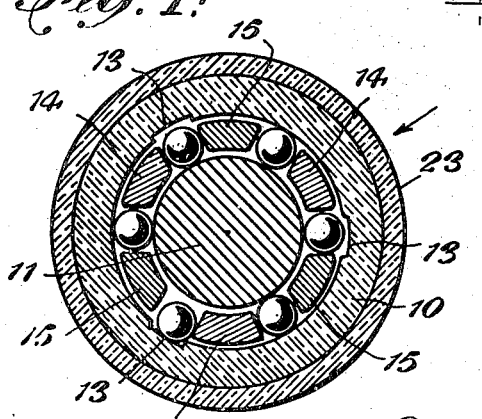
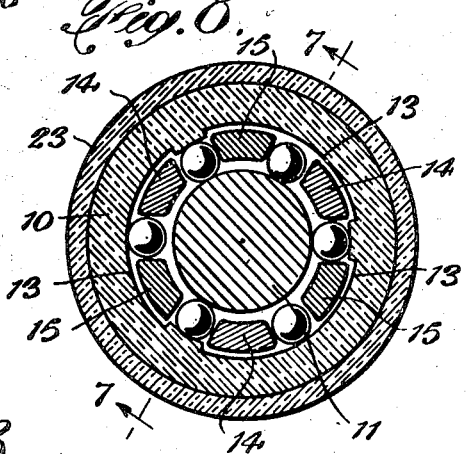
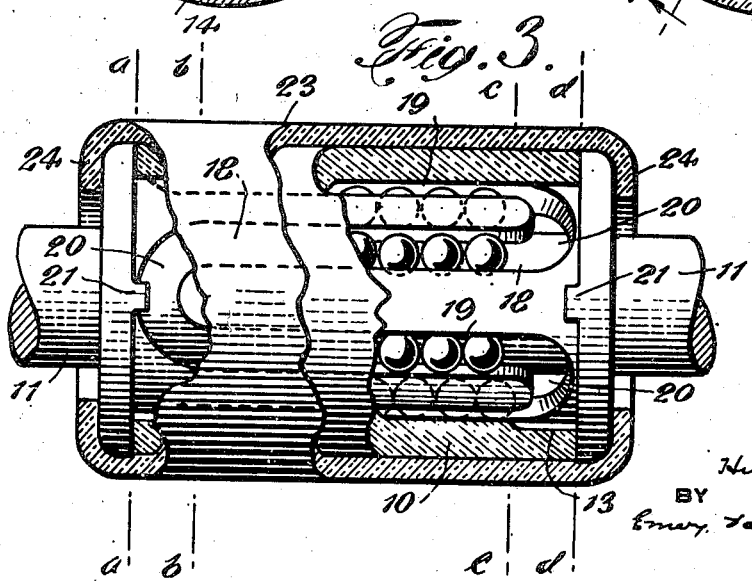

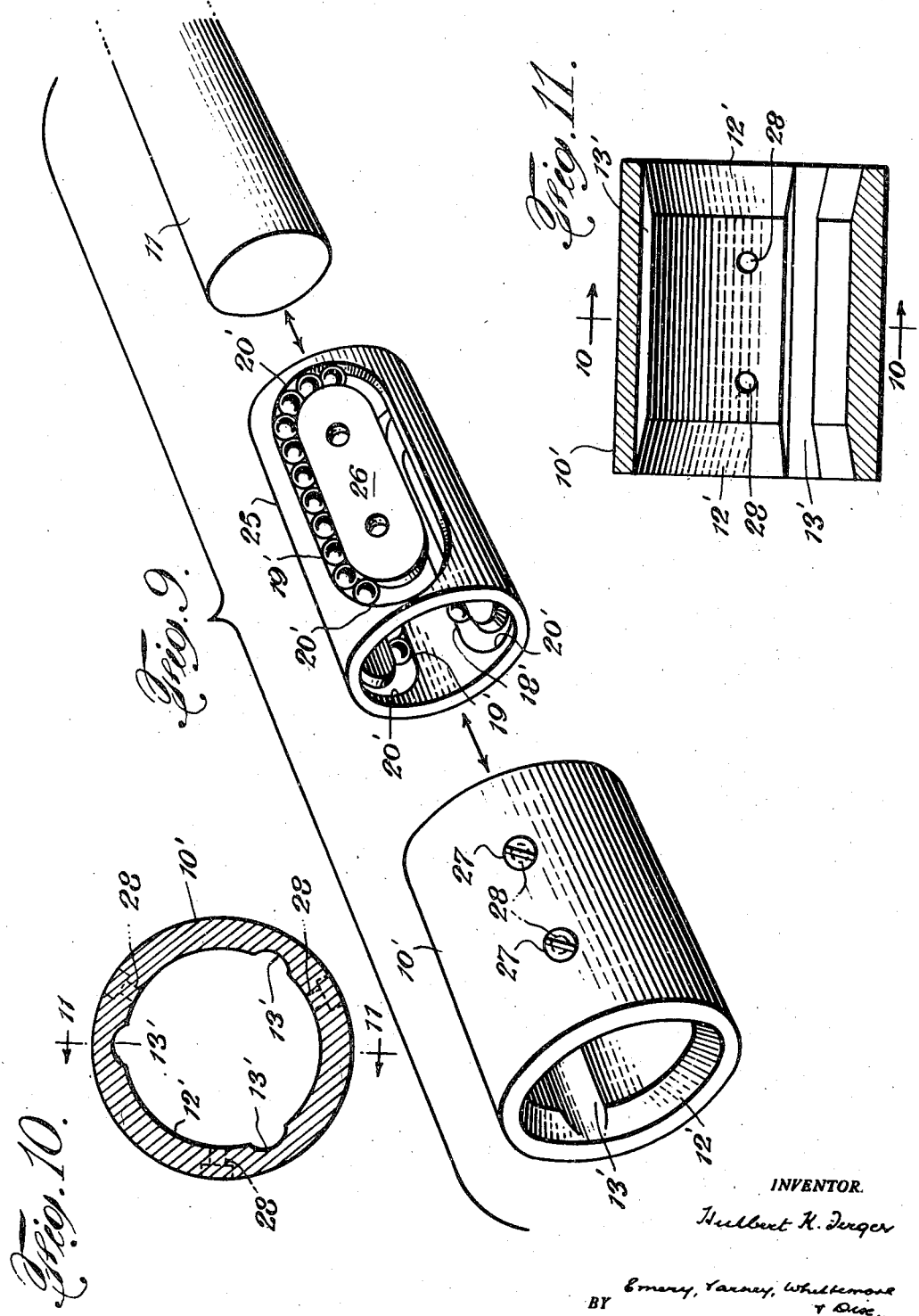

Patented Oct. 26, 1948

2,452,117

UNITED STATES PATENT OFFICE 2,452,117

SLIDING ANTIFRICTION BEARING

Hulbert K. Ferger, Flushing, N. Y., assignor of one-half to John B. Thomson, Plandome, N. Y.

Application November 6, 1945, Serial No. 626,940

11 Claims. (Cl. 308—6)

This invention relates more particularly to improvements in the designing and construction of anti-friction bearings or bushings of the type shown and described in my former U. S. patent application Serial No. 572,404, filed January 11, 1945, that is to say, bearings or bushings which travel along, as distinguished from those which merely rotate around, a shaft or the like. The present improvements are directed principally toward simplification of the manufacture of this type of bearing both in respect of number and character of the operations required for the manufacture thereof as well as of the assembling of the parts and the introduction of the bearing-balls. To the accomplishment of these ends, I have provided the improved bearings or bushings herein set forth.

In the drawings annexed hereto, Fig. 1 is a side elevation of one form of the same in position on a shaft; Fig. 2 is a perspective view of certain parts of that same form and which, in the assembled bearing, form guides for the bearing-balls; Fig. 3 is a plan view thereof looking in the direction of the arrow in Fig. 4 and partly broken away to show the inner parts some of which are in elevation and some in longitudinal section; Fig. 4 is a transverse section taken midway between the ends; Fig. 5 and Fig. 6 are views in perspective and in elevation respectively of the end of the sleeve member; Fig. 7 is a view partly in elevation and partly in central longitudinal section of a slight modification of that form of my bearing; Fig. 8 is a transverse section thereof taken on a plane indicated by the line 8—8 in Fig. 7; Fig. 9 is a perspective view of another form of my bearing, showing the outer sleeve member and an inner auxiliary ball retaining sleeve and the shaft disassembled; Fig. 10 is a view in transverse section taken centrally through the disassembled outer sleeve thereof as indicated by the lines 10—10 in Fig. 11; and Fig. 11 is a view thereof in longitudinal section taken as indicated by the line 11—11 in Fig. 10.

Referring first to Figs. 1 to 6, inclusive, the sleeve member 10, or as it may be referred to hereinafter simply as the sleeve, will generally be cylindrical in shape, particularly when the bushing is to be applied to a cylindrical shaft as 11. In any case, the sleeve 10 is counter-bored or countersunk at each end, as indicated at 12, and is provided with longitudinal recesses 13 (here shown as three in number) which may be of substantially the same depth as the counter-bores and which extends from the counter-bore at one end to the counter-bore at the other end. Between this sleeve and the shaft are ball-retaining and guiding means which may comprise two members 14 and 15 separately formed so as to be insertable into the sleeve from each end respectively. Each of the said members 14 and 15 has a plurality of long fingers 16 shown most clearly in Fig. 2 where said members have been removed from the sleeve and partially fitted together to show how, by fitting them completely together, ball-retainer guides are formed between the central shaft 11 (indicated in broken lines) and the beveled edges of said fingers. These fingers alternately project respectively from the peripheries of end-caps 17 with which said members 14 and 15 are provided and which, as shown in Fig. 3, abut against the ends of the sleeve. Thus, when the parts of the bearing have been completely assembled as shown in Fig. 3, there will be provided between the sleeve and shaft a plurality of longitudinally extending ball-retainer guides 18 and 19 and, within the area defined by the counter-bores (denoted by the broken lines a—b and c—d in Fig. 3), a plurality of approximately semi-circular ball-retainer guides 20 (hereinafter sometimes referred to as connecting ball-guides). Moreover, the ends of each of these semi-circular guides will be continuous with the respective adjacent ends of two adjacent longitudinal guides; and since the fingers 16, which define both the longitudinal and semi-circular guides, project alternately from each of the two end-caps 17, said fingers will form with the central shaft one continuous closed circuit for the bearing-balls.

The end-caps 17 are keyed to the sleeve 10 by a lug and slot connection 21, or are otherwise positioned in relation to said sleeve, so that the longitudinal guides 19 (hereinafter sometimes referred to as ball-return guides and which alternate with the longitudinal guides 18) are in register with the aforesaid longitudinal recesses 13 respectively, formed in the inner face of the sleeve; and since, as already noted, these recesses are of substantially the same depth as the counter-bores 12 and since the semi-circular connecting guides 20 are within the respective areas a—b and c—d defined by the counter-bores, the radial distance from the periphery of the shaft 11 to the surface of the counter-bores and that from the periphery of the shaft to the bottoms of said recesses, will be substantially equal and each will be greater than the radial distance from the periphery of the shaft to that portion of the inner face of the sleeve which lies between the counter-bores. Thus, since the diameter of the bearing-balls is such that the particular balls at any moment contained in the longitudinal guides 18 will have bearing contact with, that is bear upon, both the shaft and the sleeve, the balls at that moment in the ball-return guides 19 and those in the connecting ball-guides 20 will not have bearing contact with the shaft and sleeve but will be free to move in either direction as impelled by the movement of the balls in the guides 18. Thus, upon any travel of the bearing or bushing along the shaft, the balls will move throughout the entire ball circuit, those in the longitudinal guides 18 travelling in the same direction as the bearing or bushing moves, while those in the ball-return guides 19 will travel in the opposite direction, the obvious result of which will be that at one end of the bearing or bushing some of the balls in the longitudinal guides 18 will enter the connecting ball-guides 20 and at the other end an equal number of balls will enter the longitudinal guides 18 from the guides 20 at that end to replace the balls being discharged from the guides 18 at the opposite end. And for the purpose of permitting this constant transfer of the balls between the longitudinal guides 18 and the connecting guides 20 to take place smoothly and evenly, the edges of the inner face of the sleeve where said edges meet the counter-bores are sufficiently tapered as shown at 22 in Fig. 5, so that said inner face will blend gradually into the respective surfaces of the counter-bores.

The modification shown in Figs. 7 and 8 is based upon the fact that the width of the recesses 13 in the sleeve may be either approximately equal to the diameter of the balls (as in Fig. 4) or to the diameter of the balls plus twice the width of one of the fingers 16 (as in Fig. 8), without any other change in the construction of the bearing or bushing or in its principle of operation. This is too obvious to require any further description of the modification here shown in Figs. 7 and 8 or its manner of operation.

The assembling of the parts of both forms of my bearing or bushing above described may be effected conveniently as follows: The shaft is passed through the sleeve and the members 14 and 15 drawn, fingers first, over the shaft from each end and inserted in the sleeve and disposed in their keyed positions; next, one of the members 14 or 15 (say, the member 14) is withdrawn slightly from the sleeve, that is, only to the extent necessary to permit the introduction of the balls into the semi-circular guides 20; then when holding the shaft somewhat inclined from the horizontal with the member 14 uppermost and taking care to keep the member 15 in position against the other end of the sleeve, the balls are dropped in. If the member 14 is turned slightly in a direction to increase the width of either the guides 18 or 19 and so held while the balls are being introduced, the balls will readily slide down and fill the guides whose width is so increased. Then by turning the member 14 slightly in the opposite direction, the other guides may be readily filled in the same way. In any case, if the balls should not slide down these guides freely, they may be pushed down any such guide by applying a short curved rod against the uppermost ball therein. When all the ball-guides have been filled the member 14 is restored to its keyed position against the end of the sleeve. A cover 23 of plastic or like material may then be applied and its edges 24 bent around the edges of the end-caps 17 so as to overlap the same and hold the end-caps to the sleeve; or any other suitable means may be provided for this purpose.

In the commercial exploitation of my bearing or bushing, the parts will generally be assembled at the place of manufacture and a short wooden pin used in place of the shaft in such case; and it will be clear that the bearing or bushing so assembled may be readily applied to a shaft of the same diameter as the wooden pin by simply holding one end of the shaft against one end of the pin and then sliding the bearing or bushing from the pin onto the shaft.

Since other means may be substituted for the members 14 and 15 with their fingers 16, to provide the longitudinal ball retainer guides 18, the return ball-guides 19 and the connecting ball-guides 20—as, for example, the auxiliary inner sleeve 25 illustrated in Fig. 9, I regard my invention as comprising broadly the counter-boring of the sleeve 10 in combination with any longitudinal ball-guides wherein the balls have bearing contact with the shaft and sleeve, and any return ball-guides (longitudinal or otherwise) wherein the balls do not have bearing contact with the shaft and sleeve, and any connecting ball-guides (curved or otherwise) located within the respective counter-bore areas $a$—$b$ and $c$—$d$ and connecting said longitudinal ball-guides, whereby when the bearing or bushing travels along the shaft in either direction the balls discharged from the said longitudinal guides into the counter-bore areas are thereby released from bearing contact with the shaft and sleeve and delivered to the return-guides.

Referring now to Figs. 9–11, the counter-bores in the respective ends of the sleeve 10' are denoted by 12' (and may have a uniformly tapered surface as shown) and the longitudinal recesses in the inner face of said sleeve are denoted by 13'. For retaining and guiding the balls an auxiliary sleeve 25 is provided closely fitting inside the sleeve 10' and having oval-shaped portions 26 cut and removed therefrom so that their edges may be trimmed sufficiently and then beveled, and the edges of the openings left thereby in said sleeve also beveled, whereby, when said oval portions are again replaced and secured in said openings respectively, said inner sleeve 25 will be pierced at uniform intervals around its periphery with a plurality of oval shaped slots for retaining and guiding the balls. Each of those slots will thus provide two longitudinal ball-guides 18' and 19' respectively and two semi-circular ball-guides 20' connecting the guides 18' and 19' at each end. After the balls have been introduced so as to substantially fill each of the oval-shaped slots, the inner sleeve 25 is slid into the outer sleeve member 10' and secured thereto by screws which pass through holes 28 in the outer sleeve member and are threaded respectively to each of the oval-shaped portions 26. The holes 28 are so disposed in the sleeve 10' in relation to the aforesaid longitudinal-recesses 13' in that sleeve, that when the inner sleeve is thus secured in the outer sleeve the longitudinal guides 19' will be in register with the recesses 13' respectively; and these recesses, being as they are of substantially the same depth as the mean depth of the counter-bores 12', and the semi-circular guides 20' being located, as they are, within the respective areas defined by the counter-bores, the balls at any moment in the said guides 19' and 20' will be freely movable therein while the balls at that same moment in the guides 18' will have bearing contact with both the outer sleeve 10' and the shaft 11. Thus the operation of this form of my bearing or bushing will be so substantially like that of the forms previously described that further explanation thereof is unnecessary.

I claim as my invention:

1. An anti-friction bearing for shafts and the like comprising, in combination with the shaft, a sleeve having a counter-bore at each end thereof and a plurality of longitudinal recesses therein extending from one counter-bore to the other, two sets of longitudinally extending ball-guides between the shaft and sleeve whereof the guides of one set alternate with those of the other set and register respectively with said recesses while the guides of the other set are out of register with said recesses, a plurality of approximately semi-circular guides located within the respective areas defined by the counter-bores and the ends of each of which are continuous with the respective adjacent ends of two adjacent longitudinal guides, and bearing balls substantially filling all said guides and of such size that only the balls in the longitudinal guides out of register with said recesses will have bearing contact with the shaft and sleeve at any moment.

2. The bushing defined in claim 1 and further characterized by this: that the ball guides comprise two separately formed pieces fitted into the sleeve from each end and keyed thereto to hold them in proper operative relation to each other and to the recesses in the sleeve.

3. A ball-bearing for a shaft, comprising a cylindrical sleeve having counter-bores at each end and longitudinal ball-recesses extending from one counter-bore to the other and of the same depth as the counter-bores, end-caps at the ends of the sleeve, each said end-cap being provided with a central opening therein for the passage of the shaft and having fingers between the shaft and sleeve extending to within a short distance of and disposed in alternate relation to the fingers of the other end-cap so as to provide a plurality of longitudinal ball-guides each of which communicates within the counter-bore area at one end with the preceding ball-guide and within the counter-bore area at the other end with the succeeding ball-guide to form a continuous ball-circuit, and said fingers being so disposed in relation to the sleeve that one set of alternate ball-guides will be in register and the other set out of register respectively with the aforesaid recesses in the sleeve, and bearing-balls substantially filling all said ball-guides.

4. The bearing defined in claim 3 and having means to key the end-caps to the sleeve in their proper relative positions thereto, and a cover overlapping the ends to hold the end-caps to the sleeve.

5. An anti-friction bearing for longitudinal travel on a shaft or the like, comprising, in combination with the shaft, a sleeve having a counter-bore at each end thereof, a plurality of longitudinal ball-guides between the shaft and sleeve and extending from one counter-bore to the other, bearing-balls substantially filling each of aforesaid guides and in bearing contact with the shaft and sleeve, a plurality of ball-return guides and bearing-balls substantially filling the latter of the same size as the aforesaid bearing-balls but not in bearing contact with the shaft and sleeve, and connecting ball-guides located within the respective areas defined by the counter-bores for connecting the longitudinal ball-guides with the return ball-guides, whereby the balls discharged from the longitudinal ball-guides into the counter-bore areas and thus released from bearing contact with the shaft and sleeve are delivered to the return ball-guides.

6. An anti-friction bearing for longitudinal travel on a shaft or the like, comprising, in combination with the shaft, a sleeve having a counter-bore at each end thereof, a plurality of longitudinal ball-guides between the shaft and sleeve and extending from one counter-bore to the other, bearing-balls substantially filling each of said guides and in bearing contact with the shaft and sleeve, said sleeve having a plurality of longitudinal recesses therein extending from one counter-bore to the other, bearing-balls of the same size as those aforesaid and substantially filling said recesses, and curved ball-guides located within the respective areas defined by the counter-bores and connecting the longitudinal ball-guides with the longitudinal recesses, whereby the balls discharged from the longitudinal ball-guides into the counter-bore areas and thus released from bearing contact with the shaft and sleeve are delivered to the longitudinal recesses.

7. An anti-friction bearing for longitudinal travel on a shaft or the like, comprising, in combination with the shaft, an outer sleeve having a counter-bore at each end thereof and a plurality of longitudinal recesses in its inner surface, an inner sleeve between the outer sleeve and shaft and pierced with a plurality of oval-shaped slots, each said slot having curved end portions located respectively within the areas defined by the counter-bores and intermediate straight portions extending longitudinally of the shaft, one of the straight portions thereof registering with one of the aforesaid recesses, and bearing-balls substantially filling said slots.

8. A sliding anti-friction bearing for a shaft, comprising a sleeve, balls having bearing contact with the shaft and the inner face of the sleeve, a ball retainer between the shaft and sleeve providing one or more continuous ball-raceway circuits having straight axially-directed portions and curved end portions, and characterized by this: that the inner face of the sleeve is counter-bored at each end and has longitudinal recesses extending from one counterbore to the other, that the curved portions of the ball-raceway circuits lie within the areas defined by the counterbores, and that the longitudinal recesses in the sleeve are in register respectively with alternate straight portions of the ball-raceway circuits, whereby the balls as they traverse the curved portions and the said alternate straight portions of said circuits will be relieved of the load.

9. A bearing as defined in claim 8 and further characterized by this: that the ball retainer comprises two separately formed pieces fitted into the sleeve from each end of the sleeve and keyed thereto so as to hold them in proper operative relation to each other and to the longitudinally extending recesses in the sleeve.

10. A sliding anti-friction bearing for a shaft, comprising a sleeve, means within the sleeve and with which the sleeve cooperates to form one or more continuous ball-raceways having straight axially-directed portions and curved end portions, and ball substantially filling said raceways but being under load in no more than one-half the number of straight portions of the raceways, the inner face of the sleeve being counterbored at each end, and the curved portions of the raceways lying within the areas defined by the counter-bores.

11. A ball bearing for combination with a shaft, comprising a sleeve counterbored at each end, a single sinuous ballrace between the sleeve and shaft having runs extending lengthwise of the shaft, each run of the race being in communication at one end with the run at one side of it and at its opposite end with the run at the other side of it so that the race extends continuously around the shaft and forms a single continuous ball circuit, a series of balls substantially filling the ballrace, and clearances on the inner surface of the sleeve extending from one counterbore to the other and lying parallel to and over alternate runs of the race, whereby the balls in the other runs of the race will carry the bearing load and whereby relative longitudinal movement between the shaft and sleeve will roll the balls in one direction in said other runs and cause sinuous progression of the entire series of balls.

HULBERT K. FERGER.

No references cited.